Jan. 18, 1944.  E. D. DICKINSON ET AL  2,339,253
THRUST BEARING ARRANGEMENT
Filed Jan. 28, 1942
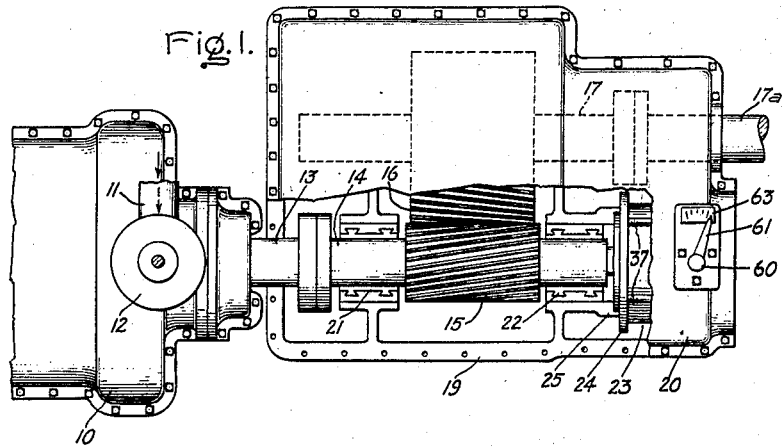
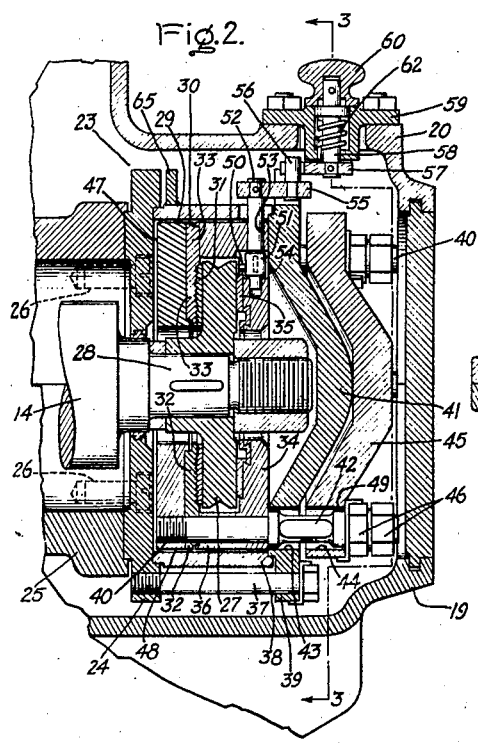
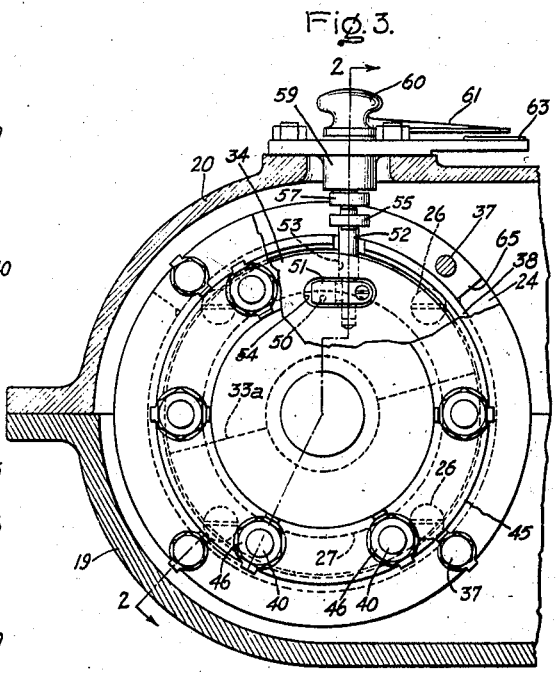
Inventors:
Edgar D. Dickinson,
Francis H. Van Nest,
by Harry E. Dunham
Their Attorney.

Patented Jan. 18, 1944

2,339,253

UNITED STATES PATENT OFFICE 2,339,253

THRUST BEARING ARRANGEMENT

Edgar D. Dickinson, Beverly, and Francis H. Van Nest, Marblehead, Mass., assignors to General Electric Company, a corporation of New York Application January 28, 1942, Serial No. 428,588

8 Claims. (Cl. 308—163)

The present invention relates to thrust bearing arrangements such as are used for supporting vertical shafts and also for horizontally disposed shafts subject to thrust forces in axial direction. The invention is of particular significance in connection with pinion shafts driven by elastic fluid turbines although it is not necessarily limited thereto. It has been found that elastic fluid turbine shafts at times are subject to considerable axial thrust forces which may be caused, for example, by water slugs passing through the turbine. Under such circumstances thrust forces of the order of 4000 lbs. per square inch on the bearing surface have been measured. Such loads can be carried for short intervals on a properly designed bearing if the proper alignment is maintained between the thrust runner and the thrust bearing. However, in many cases it is impractical to build a supporting structure for the thrust bearing which will not deflect unevenly under heavy loadings and thus produce misalignment between the thrust runner and its bearing.

The object of our invention is to provide an improved construction and arrangement of thrust bearings whereby misalignment of the bearing is reduced to a minimum and selfalignment assured during operation.

For a consideration of what we believe to be novel and our invention, attention is directed to the following description and the claims appended thereto in connection with the accompanying drawing.

In the drawing Fig. 1 illustrates a turbine driven gearing embodying my invention; Fig. 2 is a detailed view of a thrust bearing arrangement forming part of the gearing of Fig. 1; and Fig. 3 is a section along lines 3—3 of Fig. 2, while Fig. 2 is a section along lines 2—2 of Fig. 3.

The arrangement shown in Fig. 1 comprises an elastic fluid turbine 10 with an inlet conduit 11 and a control valve 12 for controlling the flow of elastic fluid to the turbine. The turbine has a shaft 13 connected to a pinion shaft 14 with a pinion 15. The pinion 15 meshes with a gear 16 secured to a shaft 17 which latter is coupled with an output shaft 17a for driving a propeller or like element. The pinion 15 and the gear 16 with their shafts are enclosed in a gear casing which has a lower half 19 and an upper half 20 flanged together.

The pinion shaft 14 with the pinion 15 is supported within the gear casing 19, 20 by means of two journal bearings 21 and 22 located on opposite sides of the pinion 15 and in addition by a thrust bearing arrangement 23 near the righthand end of the shaft 14. The thrust bearing arrangement 23 serves to take up axial thrusts, forcing the shaft 14 towards the left or right. These thrust forces are caused by the axial reaction of the gearing and the turbine rotor and the thrust forces are especially heavy in case water slugs together with high velocity steam enter the turbine and are directed with considerable force towards the bucket wheels.

The thrust bearing arrangement 23, as shown in detail in Figs. 2 and 3, comprises an adapter plate 24, in the present example separately formed and centered on a portion 25 of the gear casing and fastened thereto by a plurality of countersunk screws 26. The adapter plate 24 may be considered a part of the gear casing. A thrust runner 27 is rigidly secured to an extension 28 of the righthand end of the shaft 14. The lefthand side of the thrust runner 27 is in cooperative relation with an active thrust plate which in the present example comprises two annular plates, a first plate 29 and a second plate 30 suitably held together and concentrically surrounding the shaft extension 28. The plate 30 has a bearing lining 31 in engagement with the lefthand thrust surface of the runner 27. The plate 30 is made of two halves 32 and 33 joined along a diameter 33a (Fig. 3). This facilitates dismantling of the active thrust plate in that it permits radial removal of the two halves 32, 33 of the plate 30 for inspection and relining without requiring removal of the first plate 29. The plates 29, 30 are termed active thrust plates because they normally carry the combined thrust load of the turbine and the gear. The righthand side of the thrust runner 27 is in cooperative relation with another or normally inactive thrust plate 34 having a bearing lining 35. The plate 34 has an outer extension or boss 36 centered with and engaging the thrust plate 30. The active and inactive thrust plates are clamped together by a plurality of circumferentially spaced studs 40 and when properly dimensioned will provide the proper running clearance for the thrust runner 27.

An important feature of our invention is the structure for supporting the active and inactive thrust plates. This structure comprises a cylinder 38 rabbeted at its lefthand end to the adapter plate 24 and rabbeted at its righthand end to a supporting plate 39. The plate 39 and the cylinder 38 are securely fastened to the adapter plate 24 by a plurality of circumferentially spaced bolts 37. The supporting plate

39 has a central portion which is substantially conically shaped and concave-shaped when viewed from the lefthand side, that is, from the shaft extension 28. The portion of the supporting plate 39 opposite the shaft extension 28 forms a supporting point or convex-shaped supporting portion 41.

The active and inactive thrust plate structure 29, 30, 34 is supported on the supporting portion 41 of the plate 39. To this end the aforementioned studs 40 for clamping the thrust plates together are provided with extensions 42 passing through circumferentially spaced openings 43 in the supporting plate 39. The stud extensions 42 pass through circumferentially spaced openings 44 of a circular yoke 45 and are fastened thereto by nuts 46. The yoke 45 forms an element attached to and constituting a part of the thrust plate structure and in the present example is essentially conically-shaped and engages the aforementioned supporting portion 41 of the supporting plate 39. With this arrangement the thrust plate structure is supported on a point or portion 41 located in or near the center of the shaft.

The supporting structure and the thrust plate structure form clearances between them to permit adjustment during operation. Normally, that is, as long as the thrust bearing assembly is subject to little or no load, the yoke 45 is held firmly against the supporting portion 41, thus forming during normal operation a substantial clearance 47 between the adapter plate 24 and the thrust plate 29. If during operation the thrust bearing is subjected to abnormally high loads, as are experienced when solid water passes through the turbine, the conically-shaped supporting plate 39 and the yoke 45 yield or deflect, permitting the pinion shaft and turbine rotor to move slightly towards the left and thereby causing the clearance 47 to reduce and at the same time producing a slight clearance between the adjacent surfaces of the inactive thrust plate 34 and the supporting plate 39. With the formation of a small clearance between the thrust plate 34 and the supporting plate 39 the thrust plate structure becomes free to adjust itself so as to assure substantially uniform transmission of the thrust force from the thrust runner to the thrust plate structure. In order to permit such free adjustment a cylindrical clearance 48 is provided between the supporting cylinder 38 and the adjacent surface of the thrust plate structure, and clearances 49 are provided between the stud extensions 42 and the holes 43 and 44 in the plates 39 and 45 respectively.

The provision of means to permit automatic alignment between thrust collar and thrust plate structure reduces considerably the wear to which these parts are subjected and also permits the provision of a comparatively light gear casing.

The arrangement shown in the drawing also includes means for measuring the amount of wear of the lining 31 of the active thrust plate 32, 33. This means comprises a contact pin 50 fastened to one end of an arm 51, the other end of which is rigidly secured to a shaft 52. The shaft 52 is rotatably supported in a bearing 53 formed in the inactive thrust plate 34. This plate also has a recess 54 for accommodating the arm 51 and the pin 50. The shaft 52 projects through an opening in the supporting cylinder 38 and has an outer end fastened to one end of an arm 55, to the other end of which is secured a pin 56 arranged in cooperative relation with an actuating fork 57. The fork 57 is held on the inner end of a shaft 58 projecting through a housing 59 secured to an opening of the gear casing 19, 20. A knob 60 with a pointer 61 is secured to the outer end of the shaft 58. The shaft 58 with the knob 60 is biased against rotation by means of a spring 62 having one end secured to the housing and another end fastened to the shaft so that the contact pin 50 is normally moved away from the adjacent surface of the thrust runner 27 and the arm 51 is turned into engagement with the adjacent surface of the supporting plate 39. A scale 63 is provided on the housing 59, as indicated in Figs. 1 and 3. Normally the pointer 61 registers with the righthand end of the scale in Fig. 1.

In order to measure the wear of the active thrust plate lining 31 the knob 60 with the pointer 61 is turned counterclockwise until the contact pin 50 engages the thrust runner 27. This engagement should take place when the pointer is approximately in the center of the scale. If the engagement takes place with the pointer registering with the lefthand part of the scale, the distance from the center of the scale then indicates the amount of wear of the lining 31. The thrust bearing arrangement also includes means for supplying and circulating lubricant along the bearing surfaces to effect lubrication and cooling. Supply and discharge passages for lubricant have not been indicated in the drawing as they do not form a particular part of the invention.

In order to prevent the various parts from being assembled in the wrong angular position, a ring segment 65 is fused to an outer portion of the supporting cylinder 38. This ring segment has two spaced openings through which two of the bolts 40 pass and form a small clearance therewith. The bolts 37 have an uneven spacing so that there is only one angular position of the cylinder 39 at which all four bolts may be inserted.

Thus, with our invention we have accomplished an improved construction of thrust bearing arrangements assuring self-alignment of a thrust plate and uniform distribution of the thrust forces on such plate. Briefly, an arrangement according to our invention includes a thrust plate structure engaging a thrust collar on a rotatable shaft and a support for the structure. The thrust forces are transmitted from the structure to the support at a point located beyond the shaft end and in or near the shaft center. To this end the thrust plate structure includes an element preferably in the form of a circular conically-shaped disk located beyond the shaft end with its axis in alignment with the shaft center. The support includes an element preferably of conical shape located between the shaft end and the aforementioned element of the thrust plate structure and engaging the latter at or near a point in alignment with the shaft center. With such arrangement the entire thrust plate structure is pivotally supported and free to adjust itself about such support.

Having described the method of operation of our invention, together with the apparatus which we now consider to represent the best embodiment thereof, we desire to have it understood that the apparatus shown is only illustrative and that the invention may be carried out by other means.

What we claim as new and desire to secure by Letters Patent of the United States, is,

1. Thrust bearing arrangement comprising a shaft with a thrust collar near its end, a thrust plate structure comprising a thrust plate having a bearing surface engaging the face of the collar facing away from the shaft end and a member secured to the thrust plate and having a portion located beyond and in alignment with the shaft end, and a support for said member having an element in alignment with the shaft end for supporting said portion adjacent the shaft end uniformly to distribute the thrust load upon angular movement of the shaft.

2. Thrust bearing arrangement comprising a shaft having an end portion with a thrust collar, a thrust plate structure including a plate with an annular bearing surface engaging the collar and an element located beyond the shaft, and a support for the structure having a member located between said element and the shaft end and engaging said element at a point near the centerline of the shaft to permit angular movement of the shaft without affecting the uniform distribution of the thrust load on said annular bearing surface.

3. Thrust bearing arrangement comprising a shaft having an end portion with a thrust collar, a thrust plate structure including a stationary bearing plate engaging the collar and a circular yoke connected to the plate and located beyond the shaft with its centerline in alignment with the shaft center, and a support including a plate located between the shaft end and the yoke and engaging a portion of the yoke near the centerline of the shaft.

4. Thrust bearing arrangement comprising a shaft having an end portion with a thrust collar, a thrust plate structure including a bearing plate engaging the face of the collar facing away from said end portion and a disk fastened to the plate and located beyond the shaft end portion with its centerline in alignment with the shaft center, and a support comprising a cylinder concentrically spaced from the thrust plate structure and a supporting plate engaging the cylinder and located between the shaft and the disk, the supporting plate having a central convex-shaped portion engaging a portion of the disk near the centerline of the shaft.

5. Thrust bearing arrangement comprising a shaft having an end portion with a thrust collar, a thrust plate structure including active and inactive thrust plates engaging opposite sides of the thrust collar, a plurality of circumferentially spaced bolts clamping the thrust plates together, said bolts having extensions, and a yoke loosely connected to the extensions and located axially beyond the shaft, and a support comprising a circular plate located between the shaft and the yoke and engaging a central portion of the latter, said suppporting plate having openings through which said bolt extensions project freely, and means for supporting outer portions of the supporting plate.

6. Thrust bearing arrangement comprising a shaft having an end portion with a thrust collar, a thrust plate structure including active and inactive thrust plates engaging opposite sides of the thrust collar, an outer portion of one of the plates being extended to engage the other plate, a plurality of circumferentially spaced studs for clamping the plates together, said studs having extensions projecting axially beyond said shaft, a yoke loosely connected to said extensions, and a support for the structure comprising a cylinder concentrically spaced from the thrust plates and a circular supporting plate having an outer portion engaging the cylinder and a central portion engaging the yoke adjacent the shaft end, the supporting plate having openings forming clearances with said stud extensions.

7. The combination of a casing, a shaft having a portion located in the casing, means including journal bearings and a thrust bearing arrangement for supporting the shaft on the casing, the thrust bearing arrangement comprising a thrust collar secured to an end portion of the shaft, a thrust plate structure engaging the collar and including a yoke located axially beyond the shaft, a support for the structure including a plate engaging a portion of the yoke facing the shaft end, and means for supporting said plate on the casing, and a device for determining wear of the thrust bearing, said device including a pin located in an opening of the thrust plate structure adjacent an outer portion of the thrust collar, spring means normally biasing the pin away from the collar and means permitting movement of the pin into contact with the collar.

8. Thrust bearing arrangement comprising a shaft having an end portion with a thrust collar, a thrust plate structure including a thrust plate engaging the collar and a yoke secured to the plate and located axially beyond the shaft end, a support for the structure comprising a casing and means including a supporting plate held on the casing, said plate engaging a portion of the yoke facing the shaft end, and means for determining wear of the thrust plate comprising a pin located in an opening of the thrust plate structure adjacent an outer portion of the thrust collar, shaft means projecting through openings in the thrust plate structure and the support for holding said pin, a spring normally biasing said shaft means into a position in which the pin is spaced from the thrust collar, and means for moving the pin into engagement with the thrust collar against the force of the biasing spring.

EDGAR D. DICKINSON.
FRANCIS H. VAN NEST.